(12) United States Patent
Ukai et al.

(10) Patent No.: US 6,852,302 B1
(45) Date of Patent: Feb. 8, 2005

(54) CARBON MONOXIDE REMOVING APPARATUS AND PROCESS FOR OPERATING THE SAME

(75) Inventors: Kunihiro Ukai, Ikoma (JP); Takeshi Tomizawa, Ikoma (JP); Kiyoshi Taguchi, Moriguchi (JP); Akira Maenishi, Toyonaka (JP); Tetsuya Ueda, Kasugai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 10/130,760

(22) PCT Filed: Nov. 16, 2000

(86) PCT No.: PCT/JP00/08069

§ 371 (c)(1),
(2), (4) Date: May 20, 2002

(87) PCT Pub. No.: WO01/36322

PCT Pub. Date: May 25, 2001

(30) Foreign Application Priority Data

Nov. 18, 1999 (JP) .......................................... 11/327980

(51) Int. Cl.[7] .............................................. C01B 31/20
(52) U.S. Cl. ..................... 423/437.2; 252/373; 422/211
(58) Field of Search .......................... 252/373; 422/211; 423/246, 247, 437.2

(56) References Cited

U.S. PATENT DOCUMENTS

| | | | |
|---|---|---|---|
| 3,088,919 A | 5/1963 | Brown et al. ................ | 252/374 |
| 3,631,073 A | 12/1971 | Cohn et al. .................. | 252/376 |
| 5,518,705 A | 5/1996 | Buswell et al. ........... | 423/437.2 |
| 6,495,113 B2 * | 12/2002 | Aoyama ..................... | 423/247 |

FOREIGN PATENT DOCUMENTS

| | | |
|---|---|---|
| JP | 49-18553 | 5/1974 |
| JP | 05-201702 | 8/1993 |
| JP | 07-185303 | 7/1995 |
| JP | 2000-188122 A | 7/2000 |

OTHER PUBLICATIONS

Japanese International Search Report for PCT/JP00/08069 dated Feb. 27, 2001.

English translation of Japanese International Search Report for PCT/JP00/08069 dated Feb. 27, 2001.

* cited by examiner

*Primary Examiner*—Stanley S. Silverman
*Assistant Examiner*—Maribel Medina
(74) *Attorney, Agent, or Firm*—RatnerPrestia

(57) ABSTRACT

An apparatus of removing carbon monoxide, has:
 a hydrogen gas supply unit of supplying a hydrogen gas,
 a catalytic reaction unit provided with a catalyst body carrying a platinum group metal catalyst,
 a hydrogen gas introducing unit which introduces a hydrogen gas containing carbon monoxide from the hydrogen gas supply unit to the catalytic reaction unit, and
 an oxidizing gas supply unit of supplying an oxidizing gas containing oxygen to the catalytic reaction unit,
wherein
the catalyst body is brought into an oxidizing atmosphere for a period of time during operation according to a predetermined condition or when the apparatus is stopped. Thus, carbon monoxide can be eliminated sufficiently.

7 Claims, 3 Drawing Sheets

US 6,852,302 B1

CARBON MONOXIDE REMOVING APPARATUS AND PROCESS FOR OPERATING THE SAME

This application is a U.S. National Phase application of PCT International Application PCT/JP00/08069.

TECHNICAL FIELD

The present invention relates to a carbon monoxide removing apparatus which reduces the concentration of carbon monoxide in a gas mainly composed of hydrogen and a process for operating and stopping the apparatus, and is mainly usable for removing carbon monoxide in a fuel for low-temperature operating type fuel cells.

BACKGROUND ART

In general, hydrogen gas obtained by steam reforming of hydrocarbon materials such natural gas, alcohols such as methanol, naphtha or the like is used as a fuel gas for fuel cells. In steam reforming reactions of these fuels, catalysts are also used, such as Ni, Cu, Zn or the like which are mainly used in a reducing atmosphere and carbon monoxide is generated in such reactions as a by-product in addition to hydrogen and carbon dioxide. When the thus formed carbon monoxide remains, it poisons a platinum group metal catalyst used in cell electrodes in fuel cells of a phosphoric acid type or polymer electrolyte type operating at low temperatures and sufficient power generation performance cannot be attained. For example, in polymer electrolyte type fuel cells operating at a particularly low temperature, the cell electrodes are poisoned in a short time and the power generation performance abruptly lowers even when a gas containing as low as 50 ppm of carbon monoxide is supplied.

For this reason, a carbon monoxide converting catalyst has been used to reduce the carbon monoxide concentration in the reformed fuel gas, followed by the use of a platinum group metal catalyst to eliminate the carbon monoxide by oxidation.

For example, Japanese Patent Laid-Open No. 5-201702 discloses a technique in which a platinum or rhodium catalyst prepared with alumina carriers is used to selectively oxidize and eliminate carbon monoxide at a low temperature. Japanese Patent Laid-Open No. 7-185303 discloses another technique in which catalyst temperature is maintained constant so as to more effectively eliminate carbon monoxide.

Even when these techniques are employed, however, the platinum group metal catalysts may be deteriorated in the activity depending upon operation conditions when used in a reducing atmosphere containing carbon monoxide in a high level. The poisoning by carbon monoxide may occur on the platinum group metal catalysts in the carbon monoxide removing apparatus which oxidizes and eliminates carbon monoxide in hydrogen gas obtained by reforming and converting reactions. The poisoning tends to occur particularly under the conditions where catalyst temperature is low and the space velocity of the catalyst is high. As a result, there arises a problem in that carbon monoxide cannot be eliminated sufficiently by the carbon monoxide removing apparatus.

The object of the present invention is to solve the above described problem.

DISCLOSURE OF THE INVENTION

In order to solve the problem, the present invention provides a method of operating a carbon monoxide removing apparatus comprising:

a hydrogen gas supply unit of supplying a hydrogen gas;

a catalytic reaction unit provided with a catalyst body carrying a platinum group metal catalyst;

a hydrogen gas introducing unit which introduces a hydrogen gas containing carbon monoxide from the hydrogen gas supply unit to the catalytic reaction unit;

an oxidizing gas supply unit of supplying an oxidizing gas containing oxygen to the catalytic reaction unit; and a temperature measuring unit and a heater provided in a catalytic reaction unit, characterized in that the oxidizing gas supply unit supplies an oxidizing gas containing oxygen in an amount one second to two times the reaction equivalent of carbon monoxide at a regular operation, and that the oxidizing gas is supplied to the catalytic reaction unit which is at a temperature of 120° C. to 200° C. when the apparatus is stopped.

Further, another aspect of the present invention is the apparatus of removing carbon monoxide, wherein the oxidizing gas is supplied for a predetermined period of time after the hydrogen gas is stopped to be introduced when the apparatus is stopped.

Further, still another aspect of the present invention is the apparatus of removing carbon monoxide, comprising an air intake for taking in an outer air, wherein the hydrogen gas introducing unit is stopped when the apparatus is stopped, and the catalytic reaction unit is allowed to be cooled while the outer air is introduced into the catalytic reaction unit from the air intake.

Further, yet still another aspect of the present invention is the apparatus of removing carbon monoxide, comprising supply means of supplying nitrogen and oxygen to the catalytic reaction unit, wherein introduction of hydrogen gas through the hydrogen gas introducing unit and introduction of nitrogen and oxygen are alternately repeated during operation.

Further, still yet another aspect of the present invention is the apparatus of removing carbon monoxide, wherein the hydrogen gas supply unit contains the platinum group metal catalyst and supplies hydrogen gas in the oxidizing condition.

Further, a further aspect of the present invention is a method for operating a carbon monoxide removing apparatus comprising a hydrogen gas supply unit of supplying hydrogen gas, a catalytic reaction unit provided with a catalyst body carrying a platinum group metal catalyst, a hydrogen gas introducing unit which introduces a hydrogen gas containing carbon monoxide from the hydrogen gas supply unit to the catalytic reaction unit, and an oxidizing gas supply unit of supplying an oxidizing gas containing oxygen to the catalytic reaction unit, wherein the catalyst body is brought into an oxidizing condition for a period of time during operation or when the apparatus is stopped.

The apparatus and the method of this invention recovers the catalytic activity which has been deteriorated by the poisoning by carbon monoxide and thus enables the carbon monoxide in the hydrogen gas to be stably reduced, thereby solving the problems of conventional carbon monoxide removing apparatus.

Figure 1:
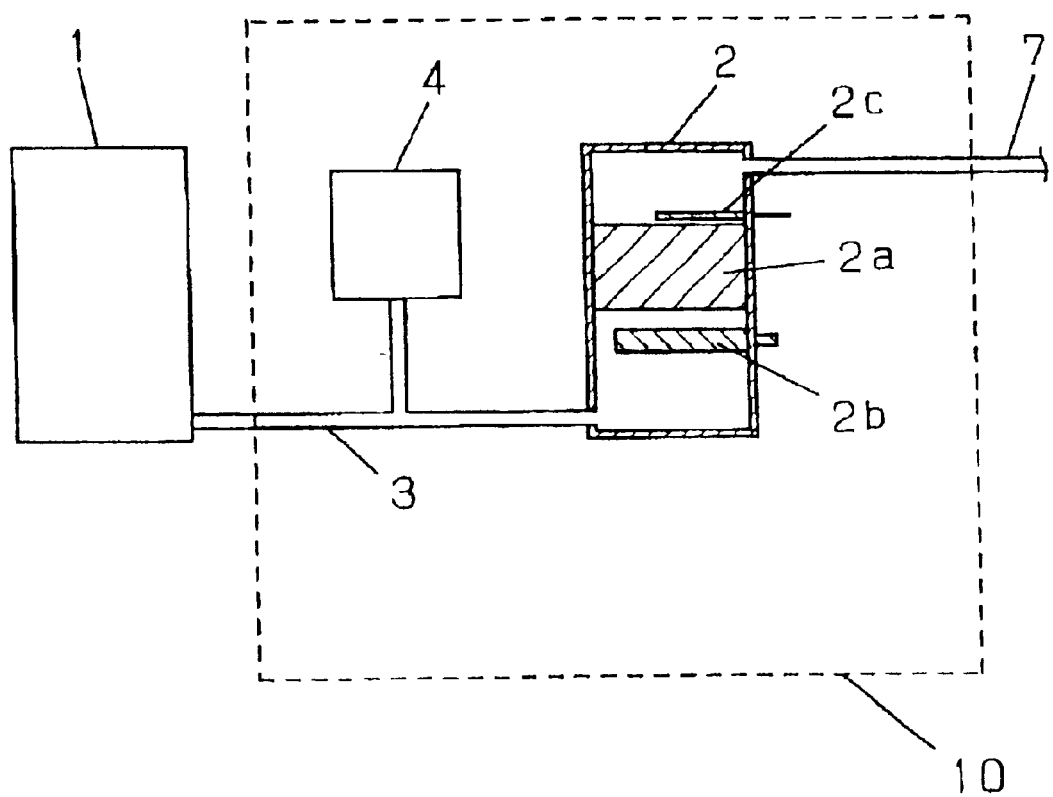
FIG. 1 is a schematic view of a carbon monoxide removing apparatus in accordance with an embodiment of this invention.

1 Hydrogen gas supply unit
2 Catalytic reaction unit
2a Catalyst body
2b Temperature adjusting unit
2c Temperature measuring unit
3 Hydrogen gas introducing unit
4 Air supply unit
5 Air intake unit
6 Mixed gas supply unit
7 Hydrogen gas discharging unit
10 Carbon monoxide removing apparatus

BEST MODE FOR CARRYING OUT THE INVENTION

Embodiments of the present invention will be hereinafter described.

When a platinum group metal catalyst is used in a reducing atmosphere containing carbon monoxide in a high level, the catalyst may be poisoned and deteriorated in the activity depending upon operation conditions. This poisoning phenomenon by carbon monoxide will occur in some operational conditions on the platinum group metal catalyst in a carbon monoxide removing apparatus which is provided for the purpose of removing carbon monoxide in a gaseous hydrogen fuel for low temperature fuel cells. The catalyst poisoning is a phenomenon caused by selective adsorption of carbon monoxide onto the active sites of the catalyst, which deteriorates the oxygen adsorption properties and makes the oxidation of carbon monoxide more difficult. As a result, the concentration of carbon monoxide at the outlet of the catalytic reaction unit increases as the poisoning of the catalyst proceeds. The poisoning phenomenon tends to occur if the carbon monoxide load on the catalyst is high. For example, it is likely to occur when the carbon monoxide concentration is high or the space velocity of the catalyst is high. Further, when the operation temperature of the catalyst is low, the amount adsorbed onto the catalyst increases, and the poisoning is also likely to occur.

To cope with these problems, measures can be envisioned as follows: that the number of the active sites is increased or the operation temperature of the catalyst is elevated so as to prevent the adsorption of carbon monoxide to the catalyst. These measures, however, do not eliminate the adsorption of carbon monoxide to the catalyst. So, when the catalyst is kept exposed to carbon monoxide, the amount of carbon monoxide adsorbed onto the catalyst increases, which may result in degradation of the catalytic activity. Consequently, it is important to once remove the carbon monoxide from the catalyst to recover the catalytic activity. However, desorption of carbon monoxide which has been adsorbed to the catalyst will not readily proceed in a reducing atmosphere.

The present invention makes use of the phenomenon that a platinum group catalyst can oxidize carbon monoxide even at a low temperature in an oxidizing atmosphere, and provides a method for recovering the catalytic activity by holding the carbon monoxide poisoned catalyst in an oxidizing atmosphere.

Embodiments of the present invention will be hereinafter described with reference to the drawings.

(Embodiment 1)

FIG. 1 is a schematic view of a carbon monoxide removing apparatus in accordance with an embodiment of this invention. In FIG. 1, reference numeral 1 denotes a hydrogen gas supply unit for supplying hydrogen gas where a hydrocarbon gas is reformed with steam to generate a hydrogen gas which contains carbon monoxide as a by-product. All the catalysts used here are platinum based. Reference numeral 2 denotes a catalytic reaction unit including as main components a catalyst body 2a containing a platinum group catalyst; a temperature adjusting unit 2b; and a temperature measuring unit 2c for measuring the temperature of the catalyst body 2a. Reference numeral 3 denotes a hydrogen gas introducing unit which provides a supply path for supplying the hydrogen gas supplied from the hydrogen gas supply unit 1 to the catalytic reaction unit 2. Reference numeral 4 denotes an air supply unit for supplying air, an oxidizing gas. The air supply unit 4 is configured to connect to the hydrogen gas introducing unit 3. Reference numeral 7 denotes a hydrogen gas discharging unit for discharging hydrogen gas made free of carbon monoxide. The hydrogen gas can be utilized in another apparatus such as a fuel cell. Reference numeral 10 denotes a carbon monoxide removing apparatus itself composed of the catalytic reaction unit 2, hydrogen gas introducing unit 3, air supply unit 4 and hydrogen gas discharging unit 7.

To the hydrogen gas transmitted from the hydrogen gas supply unit 1 is supplied air from the air supply unit 4 in a regular operation. Air is supplied in a rate so that it contains oxygen in one to four times the amount necessary for the reaction with carbon monoxide contained in the gas.

In the hydrogen gas supply unit 1, the concentration of carbon monoxide in the generated gas is generally constant depending upon the type of used gas, operation conditions and so on, therefore it can be estimated without specially providing a unit for measuring the concentration of carbon monoxide. Such a unit for measuring the concentration of carbon monoxide may be provided. The gas is transmitted to the catalytic reaction unit 2 to selectively oxidize carbon monoxide. The catalytic reaction unit 2 is controlled by using the temperature adjusting unit 2b and the temperature measuring unit 2c so that the temperature of the catalyst body 2a may be kept at 120° C. to 200° C. For example, a heater or fan can be used to control the temperature.

This embodiment of the invention is characterized in that operation of bringing the catalyst body 2a of the catalytic reaction unit 2 into an oxidizing atmosphere is carried out when the apparatus is stopped. The catalytic reaction unit is at a temperature above 120° C. as mentioned above immediately before the apparatus is stopped, so carbon monoxide adsorbed onto the catalyst can be quickly oxidized, desorbed and eliminated out of the system only by changing the atmosphere to an oxidizing one. That is, when the apparatus is stopped, the air supply unit 4 is kept in operation for a short time after the introduction of hydrogen gas from the hydrogen gas introducing unit 3 is stopped, thereby letting the air flow into the catalytic reaction unit 2 for forming an oxidizing atmosphere inside the unit. The operation of the air supply unit 4 is then stopped.

Although the catalytic reaction unit operates at 120 to 200° C. and the air supply during a regular operation is set to a rate so that oxygen is contained in an amount one-half to two times the reaction equivalent of carbon monoxide in the gas in the above embodiment, these values may vary depending upon the type of catalyst used and are not limitedly set to the above described values. Further, although catalytic activity will be degraded as the catalyst adsorbs carbon monoxide, the degradation of catalytic activity does not simply leads to an increase in the concentration of carbon monoxide at the hydrogen gas discharging unit 7, but the concentration of carbon monoxide at the hydrogen gas discharging unit 7 will abruptly increase at a time point when a certain amount of carbon monoxide has been adsorbed. Accordingly, poisoning phenomenon of the catalyst will not be apparent in some cases even when the catalyst is poisoned by carbon monoxide. The operation in accordance with the present embodiment, however, can recover the catalytic activity when the apparatus is stopped, and it enables a sufficient carbon monoxide removing performance to be always attained reliably when the apparatus is started.

A CO-poisoned catalyst in the catalytic reaction unit in a carbon monoxide removing apparatus could reduce carbon monoxide contained in hydrogen in a concentration of about 5000 ppm to about 2000 ppm at the outlet. But a catalyst body in a carbon monoxide removing apparatus in accordance with this embodiment could reduce the carbon monoxide concentration to not more than about 20 ppm when the apparatus was restarted.

In case that the operation did not have the constitution shown by this embodiment, the carbon monoxide concentration at the outlet of the catalytic reaction unit was about 2000 ppm upon the restart of the apparatus, the activity was not recovered so that it did not form a carbon monoxide removing apparatus having a sufficient performance.

(Embodiment 2)

Figure 2:
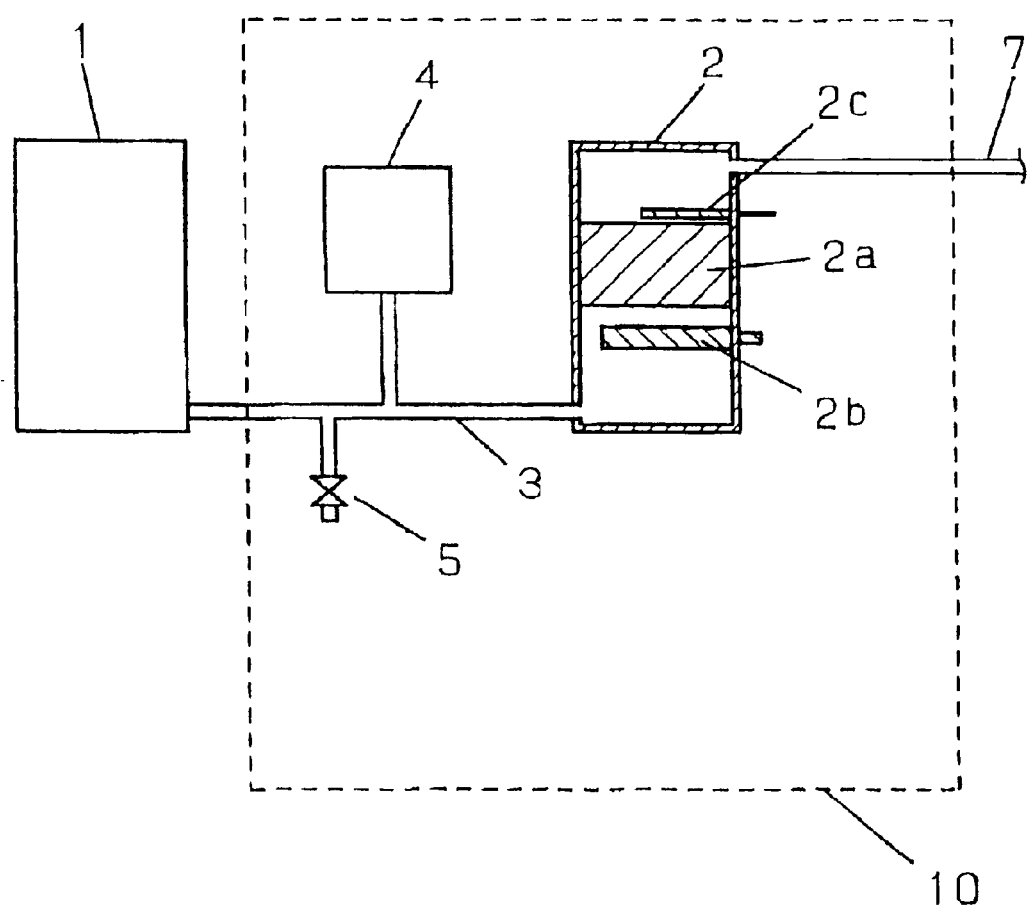
FIG. 2 is a schematic view of a carbon monoxide removing apparatus in accordance with another embodiment of this invention.

FIG. 2 is a schematic view of a carbon monoxide removing apparatus in accordance with another embodiment of this invention. This embodiment is characterized in that the hydrogen gas introducing unit 3 is provided with air intake unit 5.

In FIG. 2, reference numeral 1 denotes a hydrogen gas supply unit for supplying hydrogen gas and reforming a hydrocarbon gas with steam to generate hydrogen gas which contains carbon monoxide as a by-product. Reference numeral 2 denotes a catalytic reaction unit including as main components a catalyst body 2a containing a platinum group catalyst; a temperature adjusting unit 2b; and a temperature measuring unit 2c for measuring the temperature of the catalyst body 2a. Reference numeral 3 denotes a hydrogen gas introducing unit which provides a supply path for supplying the hydrogen gas supplied from the hydrogen gas supply unit 1 to the catalytic reaction unit 2. Reference numeral 4 denotes an air supply unit for supplying air, an oxidizing gas. The air supply unit 4 is in a configuration to be connected to the hydrogen gas introducing unit 3. Reference numeral 7 denotes a hydrogen gas discharging unit for discharging hydrogen gas made free of carbon monoxide. The hydrogen gas can be utilized in another apparatus such as a fuel cell. Reference numeral 10 denotes a carbon monoxide removing apparatus itself composed of the catalytic reaction unit 2, hydrogen gas introducing unit 3, air supply unit 4 and hydrogen gas discharging unit 7.

To the hydrogen gas transmitted from the hydrogen gas supply unit 1 is supplied air from the air supply unit 4 in a regular operation. Air is supplied in a rate so that it contains oxygen in one to four times the amount necessary for the reaction with carbon monoxide contained in the gas.

In the hydrogen gas supply unit 1, the concentration of carbon monoxide in the generated gas is generally constant depending upon the type of used gas, operation conditions and so on and can be estimated without specially providing a unit for measuring the concentration of carbon monoxide. Such a unit for measuring the concentration of carbon monoxide may be provided, of course. The gas is transmitted to the catalytic reaction unit 2 and selectively oxidizes carbon monoxide. The catalytic reaction unit 2 is controlled by using the temperature adjusting unit 2b and the temperature measuring unit 2c so that the temperature of the catalyst body 2a may be kept at 120° C. to 200° C.

This embodiment is characterized in that volume shrinkage of the catalytic reaction unit 2 caused by a natural or forced cooling when the apparatus is stopped is utilized, thereby taking in the outer air from the air intake unit 5 to bring the catalytic reaction unit 2 into an oxidizing atmosphere. That is, when the apparatus is stopped, the hydrogen gas introducing unit 3 and the air supply unit 4 are stopped to operate while the air intake unit 5 configured to be either opened or closed with an electromagnetic valve or the like operates, the catalytic reaction unit 2 is forced or allowed to be cooled and air is introduced in an amount corresponding to the volume shrinkage of the gas remaining and cooled inside the unit to bring the catalytic body 2a into an oxidizing atmosphere.

The air intake unit 5 does not need operate to take in the outer air when the apparatus is in a regular operation. The air intake unit 5 does not have to be provided in the hydrogen gas introducing unit 3 but it can be provided in any location as long as the unit can introduce air into the catalytic reaction unit 2.

For a catalyst body which had been once degraded, a carbon monoxide removing apparatus according to this embodiment is applied to reduce the carbon monoxide concentration to not more than about 20 ppm when the apparatus was restarted.

(Embodiment 3)

Figure 3:
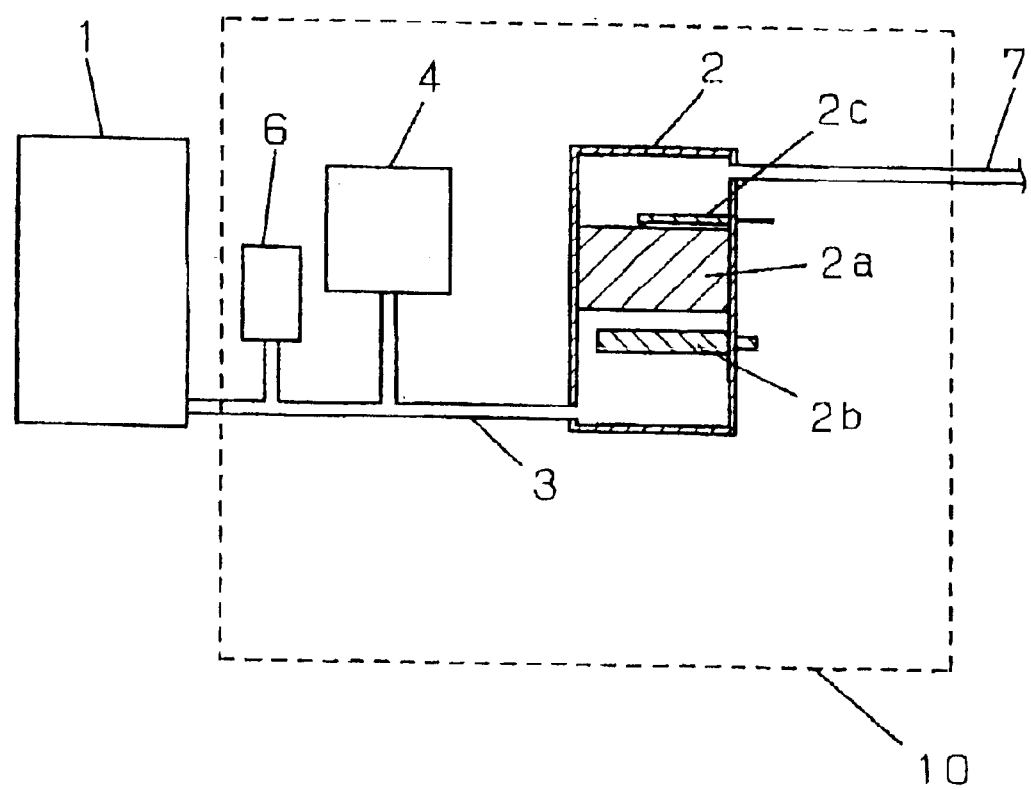
FIG. 3 is a schematic view of a carbon monoxide removing apparatus in accordance with a further different embodiment of this invention.

FIG. 3 is a schematic view of a carbon monoxide removing apparatus in accordance with a further different embodiment of this invention. This embodiment is characterized in that the hydrogen gas introducing unit 3 is provided with a mixed gas supply unit 6 for supplying a mixed gas of nitrogen and oxygen.

In FIG. 3, reference numeral 1 denotes a hydrogen gas supply unit for supplying hydrogen gas and reforming a hydrocarbon gas with steam to generate hydrogen gas which contains carbon monoxide as a by-product. Reference numeral 2 denotes a catalytic reaction unit including as main components a catalyst body 2a containing a platinum group catalyst; a temperature adjusting unit 2b; and a temperature measuring unit 2c for measuring the temperature of the catalyst body 2a. Reference numeral 3 denotes a hydrogen gas introducing unit and provides a supply path for supplying the hydrogen gas supplied from the hydrogen gas supply unit 1 to the catalytic reaction unit 2. Reference numeral 4 denotes an air supply unit for supplying air, an oxidizing gas. The air supply unit 4 is in a configuration to be connected to the hydrogen gas introducing unit 3. Reference numeral 7 denotes a hydrogen gas discharging unit for discharging hydrogen gas made free of carbon monoxide. The hydrogen gas can be utilized in another apparatus such as a fuel cell. Reference numeral 10 denotes a carbon monoxide removing apparatus itself composed of catalytic reaction unit 2, hydrogen gas introducing unit 3, air supply unit 4 and hydrogen gas discharging unit 7.

To the hydrogen gas transmitted from the hydrogen gas supply unit 1 is supplied air from the air supply unit 4 in a regular operation. Air is supplied in a rate so that it contains oxygen in one to four times the amount necessary for the reaction with carbon monoxide contained in the gas.

In the hydrogen gas supply unit 1, the concentration of carbon monoxide in the generated gas is generally constant depending upon the type of used gas, operation conditions and so on, and can be estimated without specially providing a unit for measuring the concentration of carbon monoxide. Such a unit for measuring the concentration of carbon monoxide may be provided, of course. The gas is transmitted to the catalytic reaction unit 2 to selectively oxidize carbon monoxide. The catalytic reaction unit 2 is controlled by using the temperature adjusting unit 2b and the temperature measuring unit 2c so that the temperature of the catalyst body 2a may be kept at 120° C. to 200° C.

This embodiment is characterized in that the supply of hydrogen gas and the supply of the mixed gas are alternately repeated at a regular operation. Poisoning of a catalyst by carbon monoxide proceeds at a regular operation. According to this embodiment, the introduction of hydrogen gas and the supply of the mixed gas are repeated alternately at a regular operation thereby bringing the catalyst temporarily into an oxidizing condition to desorb carbon monoxide which has been adsorbed onto the catalyst and constantly recovering the catalytic activity to enable most efficient elimination of carbon monoxide. That is, when an increase occurs in the carbon monoxide concentration discharged from the hydrogen gas unit 7 of the carbon monoxide removing apparatus 10 at a regular operation, or the time in which such an increase is expected to occur has elapsed during operation, operation of the removing apparatus 10 is controlled so that the introduction of hydrogen gas from the hydrogen gas introducing unit 3 is stopped and the mixed gas supply unit 6 is operated thereby activating the catalyst body 2a in the catalytic reaction unit 2 and thereafter the operation of the mixed gas supply unit 6 is stopped and the introduction of hydrogen gas from the hydrogen gas introducing unit 3 is restarted. This sequence of operations is repeated as needed.

Although the mixed gas supply unit 6 for supplying a mixed gas of nitrogen and oxygen is provided in the hydrogen gas introducing unit 3 in this embodiment, it can be provided in any location as long as the unit can supply the mixed gas of nitrogen and oxygen to the catalytic reaction unit 2. Further, the same effect can be attained with a construction in which oxygen is supplied from the air supply at the air supply unit 4 and only nitrogen is supplied from the mixed gas supply unit 6, or a construction in which the mixed gas supply unit 6 for supplying a mixed gas of nitrogen and oxygen is replaced with air supply unit 4. The timing on which the introduction of hydrogen gas and the supply of the mixed gas are alternately repeated can be determined based on the state of the poisoned catalyst, which in turn can be estimated from the type of the catalyst used in the catalytic reaction unit 2 and the conditions in which the catalyst is used. Alternatively, means of measuring the carbon monoxide concentration in the hydrogen gas can be provided at the outlet portion of the catalytic reaction unit, and the introduction of hydrogen gas and the supply of the mixed gas can be switched responsive to the observed concentration. There are no problems in conducting the operation described in Embodiment 1 when the apparatus is stopped.

The carbon monoxide removing apparatus of this embodiment was operated in accordance with the above described construction, and could continuously reduce the carbon monoxide concentration to not more than about 20 ppm.

The hydrogen gas outlet unit 7 will not discharge hydrogen gas made free of carbon monoxide while the catalytic body 2a is being activated and this should be taken into consideration when any other unit is connected to the vent.

Control units and the like for controlling operations of each component are not shown in Embodiments 1 to 3.

INDUSTRIAL APPLICABILITY

As described above, the catalytic activity deteriorated by the poisoning of carbon monoxide can be recovered in accordance with the present invention by bringing the catalytic body into an oxidizing atmosphere and stable operation of a carbon monoxide removing apparatus can be achieved to stably reduce the carbon monoxide concentration in the hydrogen gas.

What is claimed is:

1. A method of operating a carbon monoxide removing apparatus comprising a hydrogen gas supply unit of supplying a hydrogen gas;

a catalytic reaction unit provided with a catalyst body carrying a platinum group metal catalyst;

a hydrogen gas introducing unit which introduces a hydrogen gas containing carbon monoxide from the hydrogen gas supply unit to the catalytic reaction unit;

an oxidizing gas supply unit of supplying an oxidizing gas containing oxygen to the catalytic reaction unit; and a temperature measuring unit and a heater provided in the catalytic reaction unit, the method comprising the steps of supplying an oxidizing gas containing oxygen to a catalytic reaction unit of the carbon monoxide removing apparatus, wherein the oxidizing gas is supplied from an oxidizing gas supply unit, and the oxidizing gas is supplied substantially in an amount of one-half to two times the reaction equivalent of carbon monoxide at a regular operation; and continuing to supply the oxidizing gas to the catalytic reaction unit after ceasing to supply the hydrogen gas containing carbon monoxide from the hydrogen gas supply unit to the catalytic reaction unit, wherein the catalytic reaction unit is at a temperature of 120° C. to 200° C. when the apparatus is stopped.

2. An apparatus of removing carbon monoxide, comprising:

a hydrogen gas supply unit of supplying a hydrogen gas, a catalytic reaction unit provided with a catalyst body carrying a platinum group metal catalyst, a hydrogen gas introducing unit which introduces a hydrogen gas containing carbon monoxide from the hydrogen gas supply unit to the catalytic reaction unit, and an oxidizing gas supply unit of supplying an oxidizing gas containing oxygen to the catalytic reaction unit, and a control unit of controlling operations of the oxidizing gas supply unit so that the oxidizing gas is supplied for a predetermined period of time after the hydrogen gas has stopped being introduced, and the catalyst body is brought into an oxidizing atmosphere when the apparatus is stopped.

3. An apparatus of removing carbon monoxide, comprising:

a hydrogen gas supply unit of supplying a hydrogen gas, a catalytic reaction unit provided with a catalyst body carrying a platinum group metal catalyst, a hydrogen gas introducing unit which introduces a hydrogen gas containing carbon monoxide from the hydrogen gas supply unit to the catalytic reaction unit, an oxidizing gas supply unit of supplying an oxidizing gas containing oxygen to the catalytic reaction unit, an air intake of taking in an outer air, and a control unit of controlling operations of the hydrogen gas introducing unit so that the hydrogen gas introducing unit is stopped when the apparatus is stopped, and the catalytic reaction unit is allowed to be cooled and to be shrunk in volume while the outer air is introduced into the catalytic reaction unit from the air intake.

4. An apparatus of removing carbon monoxide, comprising:

a hydrogen gas supply unit of supplying a hydrogen gas, a catalytic reaction unit provided with a catalyst body carrying a platinum group metal catalyst, a hydrogen gas introducing unit which introduces a hydrogen gas containing carbon monoxide from the hydrogen gas supply unit to the catalytic reaction unit, an oxidizing gas supply unit of supplying an oxidizing gas containing oxygen to the catalytic reaction unit, supply means of supplying nitrogen and oxygen to the catalytic reaction unit, and a control unit of controlling operations of the supply means and the hydrogen gas introducing unit so that supply of hydrogen gas through the hydrogen gas supply unit and supply of nitrogen and oxygen are alternately operated.

5. An apparatus of removing carbon monoxide, comprising:

a hydrogen gas supply unit of supplying a hydrogen gas, a catalytic reaction unit provided with a catalyst body carrying a platinum group metal catalyst, a hydrogen gas introducing unit which introduces a hydrogen gas containing carbon monoxide from the hydrogen gas supply unit to the catalytic reaction unit, an oxidizing gas supply unit of supplying an oxidizing gas containing oxygen to the catalytic reaction unit, and a control unit of controlling operations of the oxidizing gas supply unit such that the oxidizing gas supplied from the oxidizing gas supply unit is supplied substantially in an amount of one-half to two times the reaction equivalent of carbon monoxide at a regular operation.

6. An apparatus of removing carbon monoxide, comprising:

a hydrogen gas supply unit of supplying a hydrogen gas, a catalytic reaction unit provided with a catalyst body carrying a platinum group metal catalyst, a hydrogen gas introducing unit which introduces a hydrogen gas containing carbon monoxide from the hydrogen gas supply unit to the catalytic reaction unit, an oxidizing gas supply unit of supplying an oxidizing gas containing oxygen to the catalytic reaction unit, an air intake of taking in an outer air, and a control unit of controlling operations of the oxidizing gas supply unit and the hydrogen gas introducing unit so that the oxidizing gas is supplied to the catalytic reaction unit after ceasing to supply the hydrogen gas containing carbon monoxide from the hydrogen gas supply unit to the catalytic reaction unit.

7. An apparatus of removing carbon monoxide, comprising:

a hydrogen gas supply unit of supplying a hydrogen gas, a catalytic reaction unit provided with a catalyst body carrying a platinum group metal catalyst, a hydrogen gas introducing unit which introduces a hydrogen gas containing carbon monoxide from the hydrogen gas supply unit to the catalytic reaction unit, an oxidizing gas supply unit of supplying an oxidizing gas containing oxygen to the catalytic reaction unit, a supply means of supplying nitrogen and oxygen to the catalytic reaction unit, and a control unit of controlling operations of the carbon monoxide removing apparatus so that the catalytic reaction unit is at a temperature of 120° C. to 200° C. when the apparatus is stopped.

* * * * *